Oct. 20, 1970     G. L. WILDE     3,534,556
GAS TURBINE ENGINE
Filed Jan. 30, 1969     2 Sheets-Sheet 2
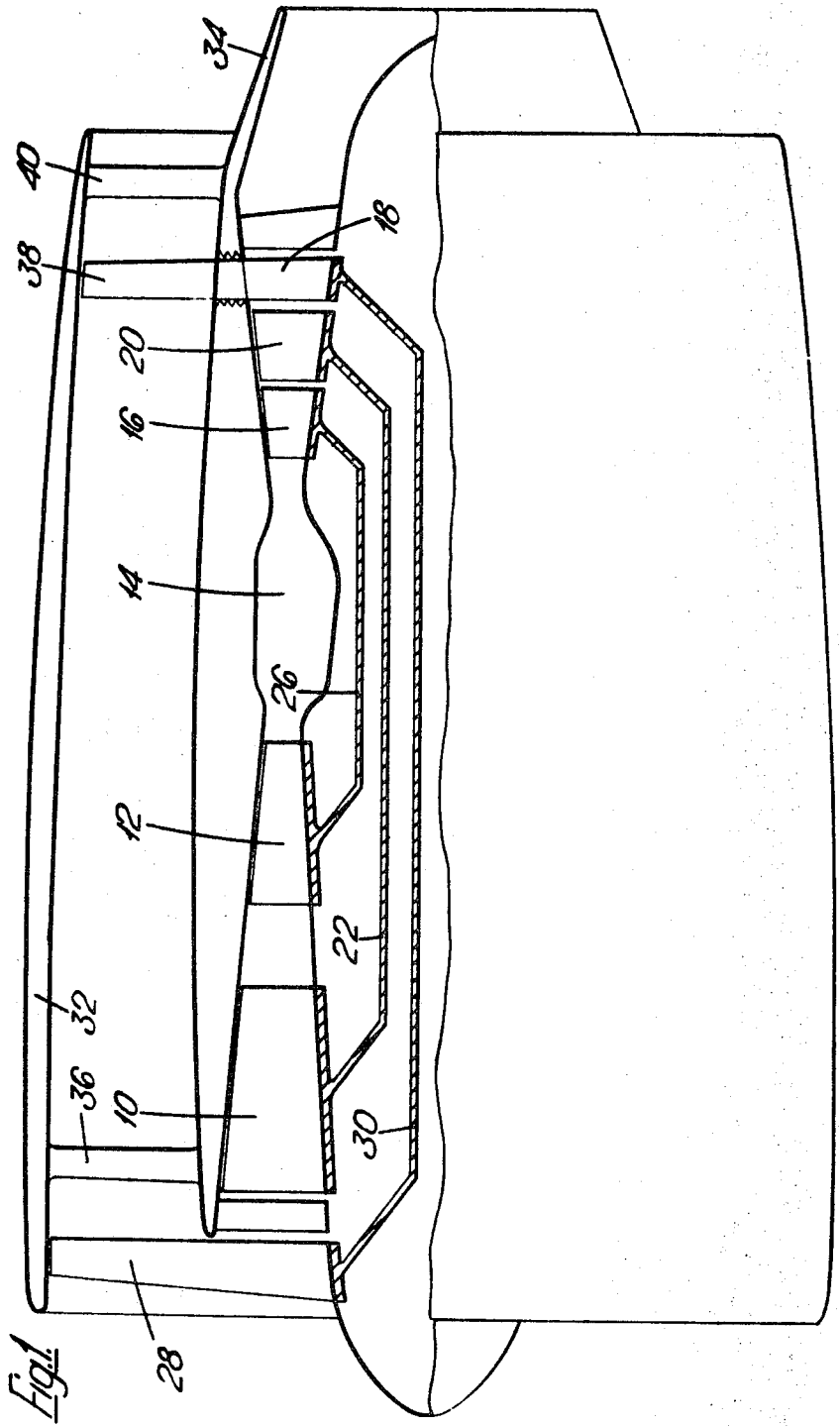
Inventor
GEOFFREY LIGHT WILDE
By
Cushman, Darby & Cushman
Attorneys

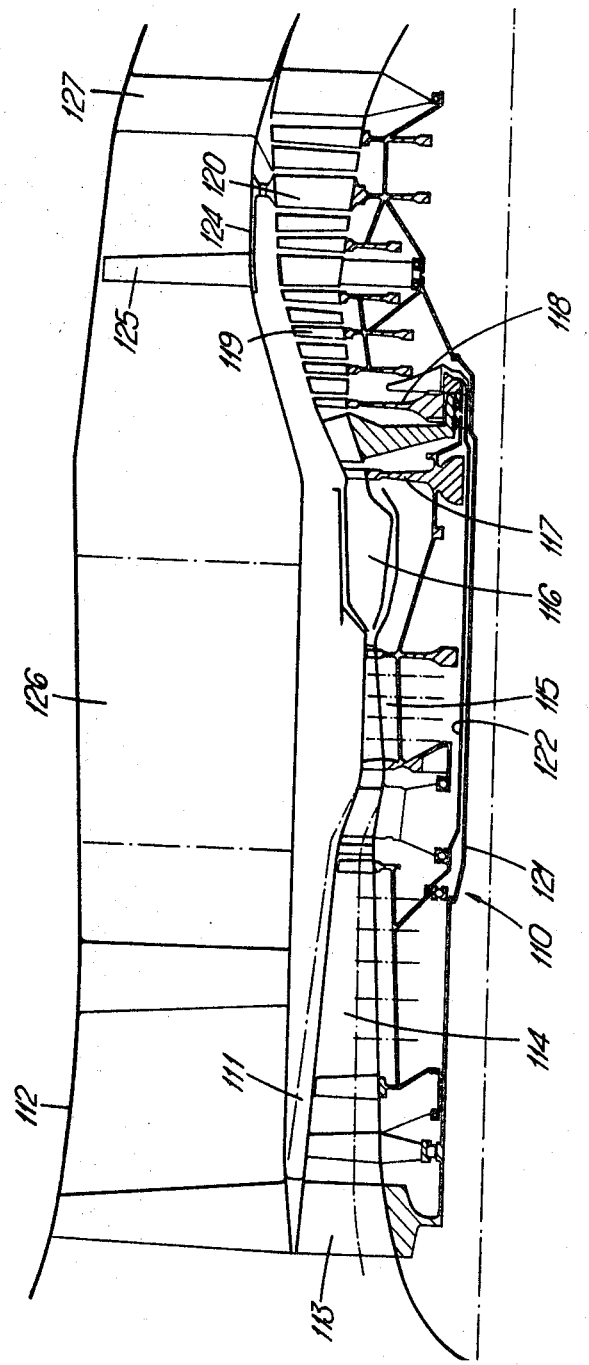

United States Patent Office 3,534,556
Patented Oct. 20, 1970

3,534,556
GAS TURBINE ENGINE
Geoffrey Light Wilde, Cowers Lane, England, assignor to Rolls-Royce Limited, Derby, England, a British company
Filed Jan. 30, 1969, Ser. No. 795,269
Claims priority, application Great Britain, Feb. 7, 1968, 5,981/68; Nov. 16, 1968, 54,489/68
Int. Cl. F02k 3/04
U.S. Cl. 60—226                        9 Claims

ABSTRACT OF THE DISCLOSURE

A gas turbine engine comprises independently rotatable intermediate and high pressure compressors, combustion equipment, independently rotatable intermediate and high pressure turbines drivingly interconnected with their respective compressors, a single stage front fan and a single stage rear fan, an inner flow duct within which said compressors, combustion equipment and turbines are disposed and, a fan flow duct within which the fans are disposed, the fans being adapted to be driven by a turbine of the engine.

---

This invention relates to gas turbine engine.

In transport aircraft it has been recent practice to use a fan engine in which a relatively high by-pass ratio is used in an engine of high power. In these circumstances the noise produced by the fan becomes a significant factor in the total engine noise. The present invention provides an engine in which the fan noise may be reduced.

According to the present invention a gas turbine engine comprises independently rotatable intermediate and high pressure compressors, combustion equipment, independently rotatable intermediate and high pressure turbines drivingly interconnected with their respective compressors, a single stage front fan and a single stage rear fan, an inner flow duct, within which said compressors, combustion equipment and turbine are disposed, a fan flow duct, within which said fans are disposed, said fans being adapted to be driven by a turbine of the engine.

Preferably there is a low pressure turbine within said inner flow duct and drivingly interconnected with said front and rear fans.

In one aspect of the invention, the low pressure turbine comprises a plurality of rotor stages, drivingly interconnected, which drive both said front and said rear fan.

In another aspect, the low pressure turbine comprises two separate, independently rotatable pluralities of rotor stages, a first said plurality being drivingly interconnected with said front fan and a second said plurality being drivingly interconnected with said rear fan.

Said fans are preferably unobstructed immediately upstream of said single stages and, comprise outlet guide vanes which are separated from their rotors by a sufficient distance that the rotor wakes are dispersed prior to entry of air to the outlet guide vanes.

The invention will now be particularly described, merely by way of example, with reference to the accompanying drawings in which:

FIG. 1 is a partly sectioned side elevation of a gas turbine engine according to the present invention; and FIG. 2 is a half section of a second embodiment of a gas turbine engine according to the invention.

Referring first to FIG. 1, the gas turbine engine comprises a gas generator having a low or intermediate pressure compressor 10, a high pressure compressor 12, combustion equipment 14 and high and low pressure turbines 16 and 18 respectively, all arranged in flow series. The low or intermediate pressure compressor 10 is drivingly connected to a single stage 20 of the high pressure turbine 16 by a shaft 22, whilst the high pressure compressor 12 is drivingly connected to a single stage 24 of the high pressure turbine 16 by a shaft 26.

The engine also includes a single stage front fan 28 carried by a shaft 30, co-axial with and nested within the shafts 22 and 26, which shaft is drivingly connected to the low pressure turbine 18. The fan 28 is located in a duct 32 which extends upstream of the entry to the low or intermediate pressure compressor, and also downstream thereof so as to terminate in substantially the same plane as the nozzle 34 of the gas generator.

The duct 32 is supported at its upstream end by an annular array of stator blades 36 which extend between the inner wall of the duct 32 and the outer casing of the low or intermediate pressure compressor 10. The downstream end is similarly supported in a manner to be described later.

The upstream ends of blades 36 are spaced downstream of the outlet from the fan 28 by a distance which is such that wakes set up in the air leaving the fan 28 will be dissipated before the air passes between the blades 36.

The outer ends of a selected rotor of the low pressure turbine 18 support an annular arry of fan blades 38 in the duct 32, whereby air which has already been compressed by the fan 28 will be further compressed and its pressure increased.

An annular array of stators 40 follows the array of fan blades 38, and as is the case of the stator blades 36, the upstream ends of the stator blades 40 are spaced downstream of the outlets from the blades 38 by a distance which is such that wakes set up in the air leaving the blades 38 will be dissipated before the air enters between the stator blades 40.

Again, the further fan is spaced downstream of the first fan 28 by a distance which is such that wakes produced by the first fan are dissipated before they reach the further fan.

A further advantage of the above described arrangement is that because two fans, spaced apart as above described are used the required compression of the air flowing through the duct 32 can be achieved whilst rotating the fans at a lower speed than would be necessary if a single stage fan were used, as in known arrangements.

This again leads to a reduction in the noise produced by the engine.

Furthermore the fan arrangement of the present invention achieves the same by-pass ratio as a front fan engine having two fan stages, but with a lower noise level.

A still further advantage of the arrangement is that because all the torque produced by the low pressure turbine does not have to be transmitted by the shaft 30, the shaft can be made smaller than would be the case if it had to transmit all the torque. This would be the case if the engine had only a front fan.

Further features of the present invention are that there are no inlet guide vanes or struts in front of either of the fans, which again leads to a reduction in the noise level of the engine.

It will also be appreciated that the low pressure turbine 18 may be provided with variable incidence nozzle guide vanes (not shown), to enable the rotational speed of the fans 28 and 38 to be reduced, to reduce noise production, for example when an aircraft incorporating the above described engine is on or close to the ground.

Alternatively or in addition a variable area final propulsion nozzle may be provided on the gas producer to achieve the same result.

In a further embodiment, shown in FIG. 2, an engine generally indicated at 110 comprises a main flow duct housed within a main flow duct casing 111 and a fan flow duct surrounding the casing 111 and itself being bounded by fan duct casing 112. Within the main duct casing 111 are mounted in flow series a front fan 113, an intermediate pressure compressor 114, a high pressure compressor 115, a combustion section 116, a high pressure turbine 117, an intermediate pressure turbine 118, a first low pressure turbine 119 and a second low pressure turbine 120. The front fan 113 is drivingly connected to the first low pressure turbine 119 by way of a low pressure shaft 121, and similarly the intermediate pressure compressor 114 and turbine 118 are interconnected by an IP shaft 122 while the high pressure compressor and turbine 115 and 117 respectively are interconnected by a high pressure shaft 123. The shafts 121, 122 and 123 are co-axial and are nested one within the other.

The second low pressure turbine 120 is mounted to rotate independently of the first low pressure turbine 119 and it carries on the radially outermost extremity of one rotor stage a drive connection 124 which drivingly interconnects the second low pressure turbine 120 and an aft fan 125 mounted within the fan duct.

It will be seen that the fan 113 acts on the flow of air through the main flow duct and also that which flows through the fan duct, while the aft fan 125 merely acts on the air passing through the fan duct. In order to enable the fan 125 to operate efficiently, it is arranged that the fan 113 leaves some whirl in the flow of air through the fan duct. This is effected by helical vanes generally indicated at 126. Because of the relatively large axial extent and relatively large blockage of these vanes 126 it is difficult to provide any additional struts extending across the fan duct. Consequently the vanes 126 are arranged to carry loads from the main casing 111 to the fan casing 112, and to enable these loads to be taken from the complete annulus of blades the fan casing 112 is reconstructed as a monocoque structure and may be connected directly to aircraft structure.

It will be appreciated that in operation the intermediate pressure and high pressure components together with the first low pressure compressor and the fan 113 act as a three shaft front fan engine. The second low pressure turbine 120 and the aft fan 125 act as a free running unit to provide further compression to the air flow through the fan duct. This leads to certain advantages. For a given mass flow through the fan duct the present arrangement enables each of the front and rear fans to perform less work on the air compared with a single stage fan, consequently reducing the total fan noise. Since the front and rear fans are spaced by almost the enitre length of the intermediate and high pressure components, the velocity gradient across wakes from the front fan impinging on the rear fan is reduced so that the noise generated by a normal closely spaced second stage is reduced. Since the rear fan and its associated turbine are a free-running unit its speed can be chosen to give the most suitable compromise between performance efficiency and noise to meet the aircraft take-off and landing flight path.

It will be noted that the rear fan 125 as shown in the drawing is provided with a set of outlet stators 127. It will be possible to design these stators to embody the fan nozzle system rather than having to provide a separate nozzle and stator system for the fan.

I claim:

1. A gas turbine engine comprising: independently rotatable intermediate and high pressure compressors, combustion equipment and independently rotatable intermediate and high pressure turbines drivingly interconnected with their respective compressors; a single stage front fan and a single stage rear fan; an inner flow duct within which said compressors, combustion equipment and turbines are disposed; a fan flow duct within which said fans are disposed; and low pressure turbine means within said inner flow duct and drivingly interconnected with said front and rear fans, said low pressure turbine means comprising two separate and independently rotatable pluralities of rotor stages, a first of said pluralities of rotor stages being drivingly interconnected with said front fan and a second of said pluralities of rotor stages being drivingly interconnected with said rear fan.

2. A gas turbine engine comprising: independently rotatable intermediate and high pressure compressors, combustion equipment, independently rotatable intermediate and high pressure turbines drivingly interconnected with their respective compressors; a single stage front fan and a single stage rear fan; an inner flow duct within which said compressors, combustion equipment and turbines are disposed; a fan flow duct within which said fans are disposed, low pressure turbine means within said inner flow duct and drivingly interconnected with said front and rear fans; and helical vanes extending across said fan duct from its casing to the inner flow duct casing.

3. A gas turbine engine as claimed in claim 2, in which said helical vanes are positioned intermediate said front fan and said rear fan.

4. A gas turbine engine as claimed in claim 2, in which said low pressure turbine means includes two separate, independently rotatable pluralities of rotor stages, a first of said pluralities of rotor stages being drivingly interconnected with said front fan and a second of said pluralities of rotor stages being drivingly interconnected with said rear fan.

5. A gas turbine engine as claimed in claim 1 and in which said fans are unobstructed immediately upstream of said single stages.

6. A gas turbine as claimed in claim 5 and in which said fans comprise outlet guide vanes which are separated from their rotors by a sufficient distance that the rotor wakes are dispersed prior to entry of air to the outlet guide vanes.

7. A gas turbine engine as claimed in claim 1 and in which said fans are separated by substantially the entire length of the remaining components of the engine.

8. A gas turbine engine as claimed in claim 1 and in which said ducts and said compressors, turbines and fans are all co-axial.

9. A gas turbine engine as claimed in claim 1 and in which said rear fan comprises outlet guide vanes which themselves form the nozzle of the fan duct.

References Cited

UNITED STATES PATENTS

| 3,316,717 | 5/1967 | Castle | 60—226 |
| 3,363,419 | 1/1968 | Wilde | 60—226 |
| 3,448,582 | 6/1968 | Bracey | 60—226 |
| 3,462,953 | 8/1969 | Wilde | 60—226 |

FOREIGN PATENTS 920,253  3/1963  Great Britain.

DOUGLAS HART, Primary Examiner